US008041601B2

(12) United States Patent
Fikes et al.

(10) Patent No.: US 8,041,601 B2
(45) Date of Patent: Oct. 18, 2011

(54) SYSTEM AND METHOD FOR AUTOMATICALLY TARGETING WEB-BASED ADVERTISEMENTS

(75) Inventors: Andrew Fikes, Los Altos, CA (US); Ross Koningstein, Menlo Park, CA (US); John Bauer, Mountain View, CA (US)

(73) Assignee: Google, Inc., Mountain View, CA (US)

(*) Notice: Subject to any disclaimer, the term of this patent is extended or adjusted under 35 U.S.C. 154(b) by 1450 days.

(21) Appl. No.: 10/676,195

(22) Filed: Sep. 30, 2003

(65) Prior Publication Data
US 2005/0071224 A1    Mar. 31, 2005

(51) Int. Cl.
*G06Q 30/00* (2006.01)
(52) U.S. Cl. .......... 705/14; 705/14.49; 705/14.51; 705/14.54; 705/14.66; 705/14.67; 705/14.72
(58) Field of Classification Search .......... 705/14, 705/14.4, 14.49, 14.51, 14.54, 14.66, 14.67, 705/14.72
See application file for complete search history.

(56) References Cited

U.S. PATENT DOCUMENTS

| | | | |
|---|---|---|---|
| 6,098,065 A | 8/2000 | Skillen et al. | |
| 6,216,129 B1* | 4/2001 | Eldering | 705/36 R |
| 6,285,999 B1 | 9/2001 | Page | |
| 6,778,975 B1* | 8/2004 | Anick et al. | 707/1 |
| 7,225,182 B2 | 5/2007 | Paine et al. | |
| 2002/0147637 A1* | 10/2002 | Kraft et al. | 705/14 |
| 2003/0050863 A1* | 3/2003 | Radwin | 705/27 |
| 2003/0055816 A1 | 3/2003 | Paine et al. | |
| 2003/0195801 A1 | 10/2003 | Takakura et al. | |
| 2004/0059708 A1* | 3/2004 | Dean et al. | 707/1 |
| 2004/0093327 A1* | 5/2004 | Anderson et al. | 707/3 |

FOREIGN PATENT DOCUMENTS

| | | |
|---|---|---|
| EP | 1 160 702 | 5/2001 |
| JP | 2002-073680 | 3/2002 |
| JP | 2002073680 | * 3/2002 |
| JP | 2002-123477 | 4/2002 |
| JP | 2003-501729 | 1/2003 |
| JP | 2003-242159 | 8/2003 |
| KR | 2001-113474 | 12/2001 |
| KR | 2003-0047859 | 6/2003 |
| WO | WO 00/73960 | 12/2000 |
| WO | WO 01/80075 | 10/2001 |

OTHER PUBLICATIONS

Notice of Preliminary Rejection for Korean Patent Application No. 10-2006-7008400, mailed Aug. 22, 2007 (4 pgs.) with translation (4 pgs.).
First Examination Report for Indian Patent Application No. 1448/CHENP/2006, dated May 22, 2008 (2 pgs.).

(Continued)

*Primary Examiner* — Eric W Stamber
*Assistant Examiner* — Tri V Nguyen
(74) *Attorney, Agent, or Firm* — Straub & Pokotylo; John C. Pokotylo

(57) ABSTRACT

A system and method for automatically targeting Web-based advertisements is described. Advertisements are identified relative to a query, wherein identified advertisements describe characteristics relative to at least one of a product and a service. The advertisements are scored according to match between the query and the characteristics of the identified advertisements. At least some of the advertisements are provided as Web-based content.

18 Claims, 7 Drawing Sheets

OTHER PUBLICATIONS

Notice of Reasons for Rejection for Japanese Patent Application No. 2006-534043, mailed Dec. 9, 2008 (3 pgs.) with translation (3 pgs.).
Examiner's Report No. 3 on Australian Patent Application No. 2004279095, mailed on Feb. 27, 2009 (3 pgs.).
Langheinrich et al, "Unintrusive Customization Techniques for Web Advertising," NEC Corporation, C&C Media Research Laboratories, Oct. 20, 2002, http://web.archive.org/web/20021020142100/www.ccrl.com/adwiz/adwiz-www8.html.
Supplementary European Search Report for European Patent Application No. 04785236.3-2221/1678573, dated Apr. 28, 2009 (3 pgs.).
Petitioner's Brief Against Korean Patent No. 857049 (33 pgs.) (with summarized English translation (15 pgs.)).
Reply Brief for Invalidation Trial Against Korean Patent No. 857049 (22 pgs.) (with English translation (14 pgs.)).
Request for Correction of the Subject Patent As Filed (58 pgs.).
Notification of the First Office Action for Chinese Patent Application No. 200480033745.2, mailed Oct. 16, 2009 (3 pgs.) with translation (5 pgs.).
Decision of Rejection for Japanese Patent Application No. 2006-534043, mailed Nov. 10, 2009 (2 pgs.) with translation (2 pgs.).
Notification of the Second Office Action for Chinese Patent Application No. 200480033745.2, mailed Jan. 25, 2011 (6 pgs.) with translation (9 pgs.).

* cited by examiner

90 — Acme Pro-Series Broom
Sleek and compact, the Acme Proton Y2K Pro-Series broom has a superior 3x extendible handle.
Acme Brooms, Inc.

Fig. 5A.

93 — Acme Combo Mop/Broom
Unique, patented design. Acme X-Ray Combination Mop/Broom. Mop while you sweep away mud, dirt and grime.
Acme Brooms, Inc.

Fig. 5B.

96 — Ordinary Broom
Acme Standard Household Broom #2. Four foot wooden handle. Straw bristles. Your choice of colors.
Acme Brooms, Inc.

SYSTEM AND METHOD FOR AUTOMATICALLY TARGETING WEB-BASED ADVERTISEMENTS

FIELD OF THE INVENTION

The invention relates in general to Web-based advertising and, in particular, to a system and method for automatically targeting Web-based advertisements.

BACKGROUND OF THE INVENTION

Although the origins of the Internet trace back to the late 1960s, the more recently-developed Worldwide Web ("Web"), together with the long-established Usenet, have revolutionized accessibility to untold volumes of information in stored electronic form to a worldwide audience, including written, spoken (audio) and visual (imagery and video) information, both in archived and real-time formats. The Web provides information via interconnected Web pages that can be navigated through embedded hyperlinks. The Usenet provides information in a non-interactive bulletin board format including static news messages posted and retrievable by readers. In short, the Web and Usenet provide desktop access to a virtually unlimited library of information in almost every language.

The Web provides an attractive advertising opportunity to product and service providers for inexpensively reaching a potentially large audience. On-line advertising can be targeted over the Web by tying Web-based advertisements to existing Web content, such as provided by on-line news and information providers. On-line advertising can also be targeted by tying Web-based advertisements to results generated by search engines in response to a user query.

Providing effective targeting is a key to successful on-line advertising. Where Web-based advertisements are provided as an adjunct to existing Web content, targeting seeks to take advantage of potential sales opportunities. Where Web-based advertisements are provided directly as search results, targeting seeks to identify the most relevant types of products and services, rather than merely providing topical Web content. Nevertheless, finding the most relevant advertisements can be difficult, particularly where the on-line advertiser has a large body of advertisements poorly grouped into generic categories of items.

One approach to targeting on-line advertisements adopts keyword searching techniques as commonly found in conventional search engines. An index of keywords is built for the search engine. Advertisers are then expected to tie into the keyword index by associating keywords with each product or service offered. Forming a keyword list for each product or service offered can be especially onerous for the advertisers with large sets of potential offerings which change frequently. Moreover, the ability to provide effective targeting becomes dependent on whether the search engine can interpret and broaden keywords found in user queries sufficiently to identify relevant advertisements. At best, advertisers can guess at new keywords in the hopes that better keywords will lead to more hits. Finally, relying on purely keyword-based targeting can unhelpfully generate results containing duplicative or comparable products or services.

From a content provider's standpoint, effective targeting can lead to increased advertising revenue. However, the space available for on-line advertisements on any given Web page is limited and, as a result, an increasing number of content providers have begun to offer Web-based advertisements presented in a standardized format, similar to conventional newspaper classified advertisements, and independent of advertising source. One common advertisement format uses a product name and informational body containing an extended product name, description, category name, merchant information, or other content. These standardized formats can increase the number of advertisements appearing on a Web page and consequently advertising revenue, but potential revenue is lost when non-responsive or unrelated advertisements appear, particularly where advertising revenue is derived from variable costs, such as charged for the space occupied by each advertisement and for the number of times an advertisement is displayed and selected by end users.

Therefore, there is a need for an approach to targeting Web-based advertisements to users based on an evaluation of queries using substantially the full context of the description of the products and services. Preferably, such an approach would score each potential advertisement based on the quality of the degree of match to the query and factor in the fixed and variable costs to enhance advertising revenue.

There is a further need for an approach to targeting and generating advertising creatives for identified relevant advertising using advertisements identified relative to the characteristics and information associated with each product and service offered.

SUMMARY OF THE INVENTION

An embodiment of the invention provides a system and method for automatically targeting Web-based advertisements. Advertisements are identified relative to a query, wherein identified advertisements describe characteristics relative to at least one of a product and a service. The advertisements are scored according to match between the query and the characteristics of the identified advertisements. At least some of the advertisements are provided as Web-based content.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

BRIEF DESCRIPTION OF THE DRAWINGS

FIGS. 5A-C are diagrams showing, by way of example, advertising creatives for use by the targeting and advertising creative generator of FIG. 2.

DETAILED DESCRIPTION

System Overview

Figure 1:
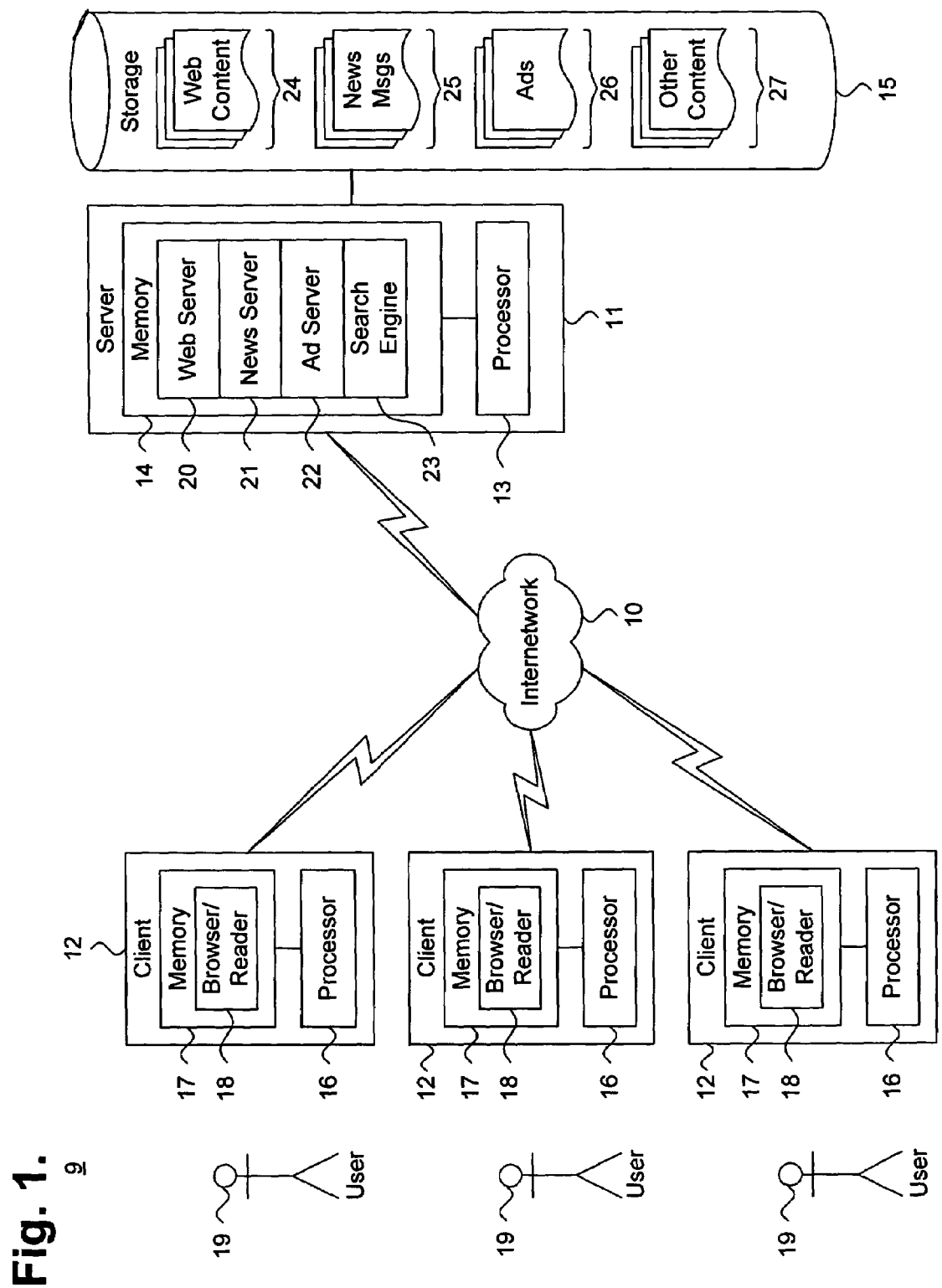
FIG. 1 is a block diagram showing a system for automatically targeting Web-based advertisements, in accordance with the invention.

FIG. 1 is a block diagram showing a system 9 for automatically targeting Web-based advertisements, in accordance with the invention. A plurality of individual clients 12 are communicatively interfaced to a server 11 via an internetwork 10, such as the Internet, or other form of communications network, as will be appreciated by one skilled in the art. The individual clients 12 are operated by users 19 who transact requests for Web content, news messages, advertisements, other types of content, and other operations through their respective client 12.

In general, each client 12 can be any form of computing platform connectable to a network, such as the internetwork 10, and capable of interacting with application programs. Exemplary examples of individual clients include, without limitation, personal computers, digital assistants, "smart" cellular telephones and pagers, lightweight clients, workstations, "dumb" terminals interfaced to an application server, and various arrangements and configurations thereof, as will be appreciated by one skilled in the art. The internetwork 10 includes various topologies, configurations, and arrangements of network interconnectivity components arranged to interoperatively couple with enterprise, wide area and local area networks and include, without limitation, conventionally wired, wireless, satellite, optical, and equivalent network technologies, as will be appreciated by one skilled in the art.

For Web content retrieval and news message posting and retrieval, each client 12 executes a Web browser and news reader application 18 ("Browser/Reader"). Web content 24 is requested via a Web server 20 executing on the server 11. Similarly, news messages ("News Msgs") 25 are posted and retrieved via a news server 21 also executing on the server 11. In addition, advertisements ("Ads") 26 are provided with the Web content 24, news messages 25, and other content 27 via an advertisement server ("Ad Server") 22 also executing on the server 11. The advertisements 26 provide stored advertisement feeds and can also include standardized advertisements that normalize the general layout and appearance of Web-based advertisements through a common format, such as product name and body. The advertisement server 22 can target the advertisements 26 for inclusion with or in lieu of the Web content 24, news messages 25, and other content 27, as further described below with reference to FIG. 2. Other types of server functionality can be provided, as will be appreciated by one skilled in the art. Note the Web browsing, news reading, and advertising functions could be also be implemented separately as stand alone applications.

The server 11 maintains an attached storage device 15 in which the Web content 24, news messages 25, advertisements 26, and other content 27 are stored. The Web content 24, news messages 25, advertisements 26, and other content 27 could also be maintained remotely on other Web and news servers (not shown) interconnected either directly or indirectly via the internetwork 10 and which are preferably accessible by each client 12.

A search engine 23 executes on the server 11 for processing queries for Web content 24, news messages 25, advertisements 26, and other content 27. Each query is meant to describe or otherwise identify information potentially retrievable via either the Web server 20 or news server 21. The information can include other information also determined to be relevant to the query. Preferably, each query provides characteristics, typically expressed as terms, including individual words and compounds. The search engine 23 receives each query, identifies matching Web content 24, news messages 25, advertisements 26, and other content 27, and sends back results conforming to the query preferences. Other styles, forms or definitions of queries, query characteristics, and related metadata are feasible, as will be appreciated by one skilled in the art.

The search engine 23 preferably identifies the Web content 24, news messages 25, advertisements 26, and other content 27 best matching the search query terms to provide high quality search results, such as described in S. Brin and L. Page, "The Anatomy of a Large-Scale Hypertextual Search Engine" (1998) and in U.S. Pat. No. 6,285,999, issued Sep. 4, 2001 to Page, the disclosures of which are incorporated by reference. In identifying matching Web content 24, news messages 25, advertisements 26, and other content 27, the search engine 23 operates on information characteristics describing potentially retrievable content. Note the functionality provided by the server 20, including the Web server 20, news server 21, advertisement server 22, and search engine 23 could be provided by a loosely- or tightly-coupled distributed or parallelized computing configuration, in addition to a uni-processing environment.

The individual computer systems, including server 11 and clients 12, include general purpose, programmed digital computing devices including a central processing unit (processors 13 and 16, respectively), random access memory (memories 14 and 17, respectively), non-volatile secondary storage 15, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage.

Targeting and Advertising Creative Generator

Figure 2:
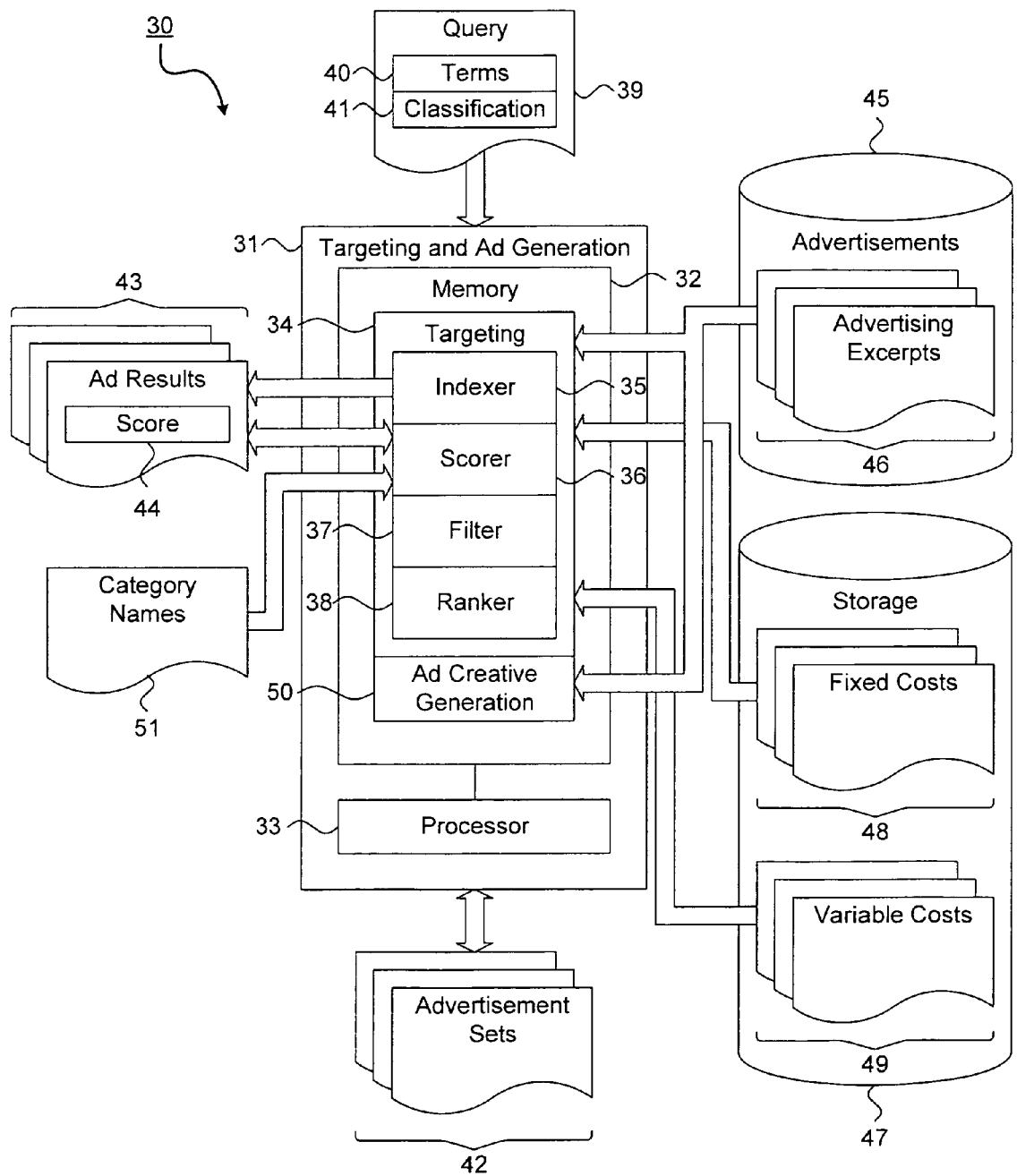
FIG. 2 is a functional block diagram showing a targeting and advertising creative generator, in accordance with one embodiment of the invention.

FIG. 2 is a functional block diagram 30 showing a targeting and advertising creative generator 31, in accordance with one embodiment of the invention. The targeting and advertising creative generator 31 targets advertisements 45 based on a query 39 received from a user 19 and provides advertisement sets 42 as Web content to the advertising server 22 (shown in FIG. 1). The advertisement sets 42 can include advertising creatives. Each of the advertisements 45 is considered substantially in the entirety by scoring a degree of match between terms 40 appearing in the query 39 and characteristics of each identified advertisement 45, thereby eliminating the need for advertisers to supply keywords as part of each advertisement 45. The advertisement sets 42 are provided to the advertising server 22 for further evaluation and potential inclusion with or in lieu of the Web content 24, news messages 25, and other content 27.

The targeting and advertising creative generator 31 includes storage for maintaining the advertisements 45, which are provided to the targeting and advertising creative generator as advertising excerpts 46. The advertising excerpts 46 include documents and excerpts of the documents specifying each of the advertisements 45. Each of the advertisements 45 is preferably structured to store advertising information and characteristics, such as further described below, by way of example, with reference to FIG. 3. The advertising excerpts 46 can also include Web content, news messages, advertisements, and other content, including the Web content 24, news messages 25, advertisements 26, and other content 27 stored by the server 11 (shown in FIG. 1), as well as documents and excerpts from other sources.

The targeting and advertising creative generator 31 also includes storage 47 for maintaining fixed costs 48 and variable costs 49 associated with the advertisements 45. The space available for displaying advertising creatives on a Web page generally is limited, particularly when the advertising creative is provided for inclusion with existing Web content 24, news messages 25, and other content 27. As a result, Web content providers generally charge on-line advertisers for both the space occupied by each Web-based advertisement and for the number of times an advertisement is displayed and selected by end users. The costs for space are often fixed based on an amount that the advertiser is willing to pay, in part, based on the size, layout and content of the advertisement 45. The costs for display and selection frequency are often variable due to the uncertainty that a particular advertisement 45 might not be displayed due to space limitations or other reasons and whether a user 19 actually decides to select the advertisement 45. Such fixed and variable costs are stored as the fixed costs 48 and variable costs 49. In alternative embodiments, other types of costs and advertiser revenue capturing schemes are possible, including basing costs on the ratio of the number of times that an advertisement 45 is viewed and the number of times, that is, frequency, that the advertisement 45 is actually selected, as will be appreciated by one skilled in the art.

The targeting and advertising creative generator 31 include two components: targeting 34 and optional advertising creative generator 50. The targeting component 34 identifies advertisements 45 relative to the query 39 and scores the identified advertisements 45 preferably according to the degree of match between the terms 40 and factors 41 in the query 39 and the information and characteristics specified in the identified advertisements 45. The targeting component 34 includes four subcomponents: indexer 35; scorer 36; filter 37; and ranker 38.

The indexer 35 executes an advertisement search by evaluating the query 39 against the information and characteristics maintained in the advertisements 45. Upon completing the advertisement search, the indexer 35 generates a set of advertising results 43, which contain the advertising excerpts 46, by applying the terms 40 specified in the query 39 to the stored information and characteristics. In a further embodiment of the invention, the query 39 can be expanded by integrating additional information, such as category names 51 of products or services, or through a combination of actual content and category names 51.

In a still further embodiment of the invention, the terms 40 of the query 39 are broadened or stemmed to modify the scope of the query 39, such that the search results reflect an increased breadth, rather than a narrowing, limiting, or otherwise restricting of the search scope, such as described in commonly-assigned U.S. patent application Ser. No. 10/629,479, filed Jul. 28, 2003, pending, the disclosure of which is incorporated by reference. The indexer 35 can integrate the broadened terms when executing advertisement searches against the information and characteristics maintained in the advertisements 45.

In a still further embodiment of the present invention, a search query 39 is not necessary for operation of the invention; instead, the concept or topic of a document, such as a Web page, can be used to determine other documents, including the advertisements 45, that may then be ordered or ranked, such as described in commonly-assigned U.S. patent application Ser. No. 10/389,688, filed Mar. 14, 2003, pending; U.S. patent application Ser. No. 10/375,900, filed Feb. 26, 2003, pending; U.S. patent application Ser. No. 10/314,427, filed Dec. 6, 2002, pending; and U.S. Provisional Patent application Ser. No. 60/413,536, filed Sep. 24, 2002, pending, the disclosures of which are incorporated by reference.

In one implementation, the indexer 35 can identify thousands or even millions of advertising results 43, so only a subset of the advertising results 43, such as, in this implementation, between 100 to 10,000, are retained as the most promising advertising results 43. The most promising advertising results 43 are then ranked or scored by degree of match to the terms 40 of the query 39. The advertising results 43 can be numerically scored to reflect a relative quality or relevance of match.

The scorer 36 assigns a numerical score 44 to each advertising result 43 for indicating a quality of match. The numerical score 44 is matched to the advertising result 43 in an advertisement score tuple, as further described below with reference to FIG. 4. The numerical scores 44 can then be sorted and evaluated against a predefined threshold to filter the advertising results 43. The numerical score 44 can be based on the degree of match to the actual content of each advertisement 45, to a category names 51 of products or services to which the advertisement 45 is associated, or by a combination of actual content and category names 51. Preferably, the scored advertising results 43 are sorted by score 44 and those advertising results 43 failing to meet a predefined threshold are eliminated from further consideration.

Briefly, a categorical match measures the closeness of fit between the terms 40 in the query 39 and one or more category names 51 of products and services. Category names 51 can be used to efficiently aggregate multiple individual advertisements 45 for products and services and can significantly decrease the identification of numerous, closely-related advertisements 45, which can effect the quality of the advertising results 43 through dilution and duplicity. The category names 51 can be arbitrary or descriptive, can reflect product or service information and characteristics, or can reflect interrelationships and independencies between other category names 51 or advertisements 45. In a further embodiment of the invention, the category names 51 are organized as a hierarchy, which can be indexed and searchable by the indexer 35 or other searching component. Furthermore, multiple category names can be used, such as provided by an advertiser or for internal system use.

Each query 39 can be classified by the search engine 23 (shown in FIG. 1) based on one or more factors, including, for example, country, locale, language, daily budget, and other factors. The filter 37 prunes the advertising results 43 by applying the classifications 41 in the query 39 to the information and characteristics associated with each advertising result 43. The ranker 38 applies a selection criteria to those advertising results 43 remaining after evaluation against the predefined scoring threshold and the classifications 41. The ranker 38 applies a ranking cutoff to the fixed costs 48 and variable costs 49 to determine the advertising results 43, which are acceptable. The ranked advertising results 43 can then be ordered and evaluated against the ranking cutoff to filter the advertising results 43. Following ranking, the targeting component 34 provides the remaining advertising results 43 and associated fixed costs 48 and variable costs 49 as advertisement sets 42 containing advertising creative tuples, as further described below with reference to FIG. 6.

Finally, the optional advertising creative generation component 50 builds Web-based advertising creatives for inclusion in the advertisement sets 42 or advertisements 45. Briefly, the advertising creative generation component 50 uses the terms 40 that constitute each query 39 to help identify and summarize the product or service information contained within advertising excerpts 46 into advertising creatives, such as further described below with reference to FIGS. 5A-C. In a further embodiment of the invention, the optional advertising creative generation component 50 generates advertising creatives based on the category names 51 and can use any other type or source of information describing the products or services. The generated advertising creative is then provided to the advertising server 22 for inclusion with or in lieu of the Web content 24, news messages 25, and other content 27.

In a further embodiment of the invention, advertising creatives can be specified relative to an advertisement 45, either directly by including an advertising creative with the advertisement 45, or indirectly, such as through a hyperlink associated with the advertisement 45. Alternatively, the corresponding advertising excerpt 43 can include hints or predefined text, which could be used as an advertising creative. As well, advertising creatives can be precomputed or cached.

In a further embodiment of the invention, an identification and extraction engine (not shown) identifies information fields in a document or related set of documents and extracts data from a source document using the information fields, such as described in commonly-assigned U.S. patent application Ser. No. 10/675,756, entitled "Systems and Methods for Information Extraction," filed Sep. 30, 2003, pending, the disclosure of which is incorporated by reference. The source document can be maintained in the storage with the advertisements 45 or could also be maintained remotely on other Web and news servers (not shown) interconnected either directly or indirectly via the internetwork 10. The extracted data can be used by the optional advertising creative generation component 50 to build Web-based advertising creatives for inclusion in the advertisement sets 42 or advertisements 45, or to an advertisement generator (not shown) to build new advertisements 45. The new advertisements 45 could then be identified by the targeting component 34 relative to further queries 39.

The individual computer system, including the targeting and advertising creative generator 31, include general purpose, programmed digital computing devices including a central processing unit (processor 33), random access memory (memory 32), non-volatile secondary storage 47, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage. In particular, the advertising server 22, targeting component 34, and advertising creative generation component 50 are functionally discrete components, although the operations performed by each component could be combined within a single system or distributed over a plurality of individual systems in a multiprocessing arrangement.

Advertising Excerpt Data Structure

Figure 3:
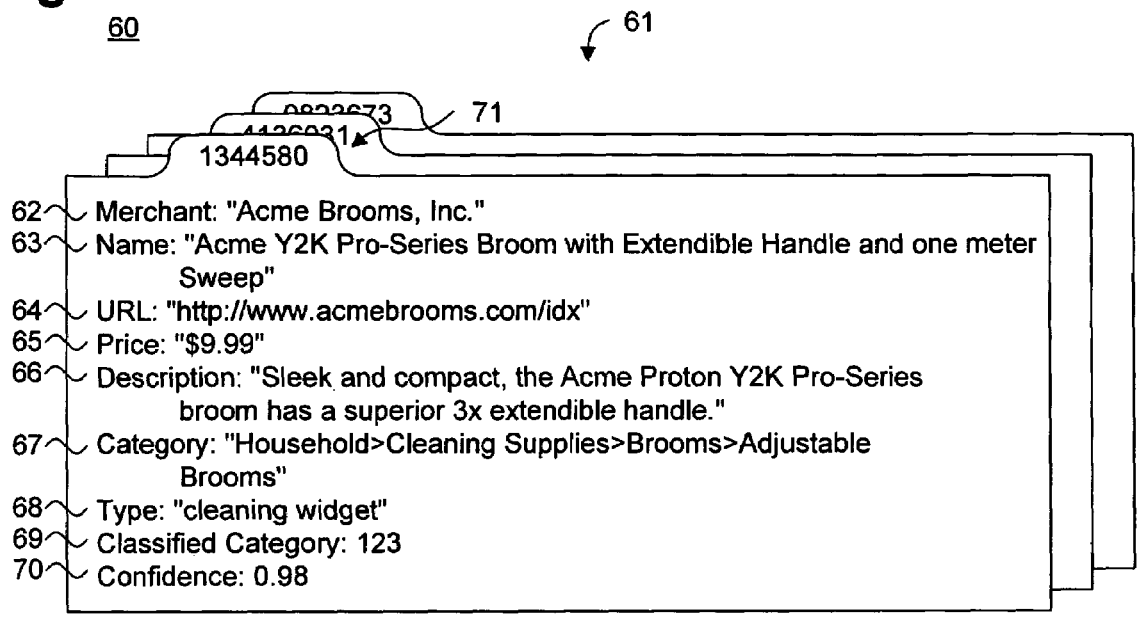
FIG. 3 is a data structure diagram showing, by way of example, an advertising excerpt for use by the targeting and advertising creative generator of FIG. 2.

FIG. 3 is a data structure diagram 60 showing, by way of example, an advertising excerpt 61 for use by the targeting and advertising creative generator 31 of FIG. 2. In one embodiment of the invention, each advertising excerpt 61 includes an identifier 71, such as a numerical index or similar indication. The advertising excerpt 61 is preferably organized as a structured record or similar type of organization, whereby individual fields representing predefined categories of product information can be identified. By way of non-exclusive example, in one embodiment of the invention, the advertising excerpt fields include the following:

Merchant (62): Identifies the name of a merchant providing the product or service. Additional merchant-related information can be obtained by performing a lookup of a related merchant records (not shown). Alternatively, the merchant field 62 can include complete merchant information.

Name (63): Provides the name of the product or service.

URL (64): Provides a Uniform Resource Locator (URL) or similar hyperlink reference to identify on-line product or service information.

Price (65): Provides a price, range of prices, opening bid, or similar pricing information associated with the product or service.

Description (66): Specifies a description of the product or service. Preferably, the description field 66 is written in complete sentences or phrases.

Category (67): Identifies the category name or category path, if a hierarchy of category names 51 is used, to which the advertising excerpt 61 is most closely related.

Type (68): Provides a generic product or service type identifier.

Classified Category (69): Associates a classified category name most closely matching the product or service based on an approximated best fit. The classified category 69 could be different than the assigned category 67.

Confidence (70): Specifies the level of confidence assigned to the classified category 69.

Other fields, types and collections of product and service information could be provided, either in addition to or in lieu of the forgoing, and can include metadata as well as explicit information, as will be appreciated by one skilled in the art.

Advertisement Score Tuples

Figure 4:
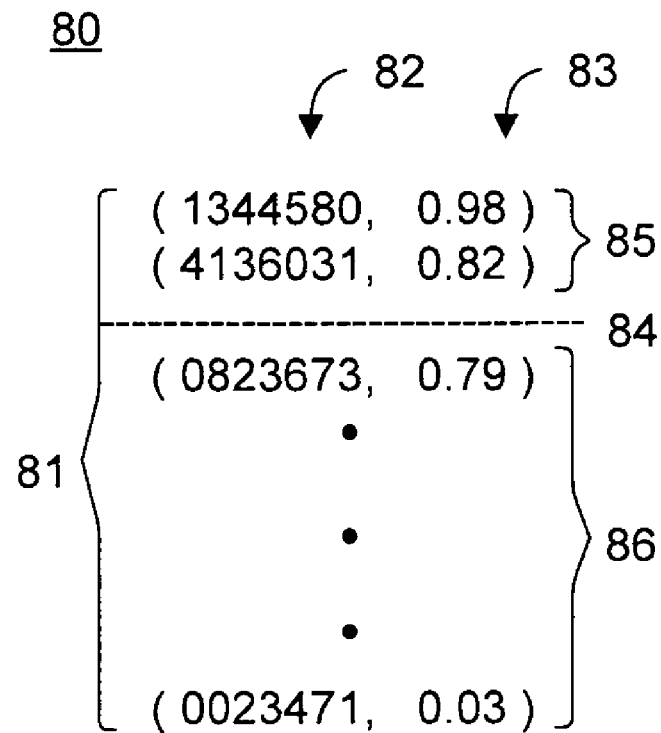
FIG. 4 is a data structure diagram showing, by way of example, a set of advertisement score tuples scored by the targeting and advertising creative generator of FIG. 2.

FIG. 4 is a data structure diagram 80 showing, by way of example, a set of advertisement score tuples 81 scored by the targeting and advertising creative generator 31 of FIG. 2. The identified advertising results 43 and associated scores 44 indicating quality of match are paired into tuples 81 containing an identifier 82 corresponding to the identifier 71 of the corresponding advertising excerpt 46 and associated the score value 83. The score values 83 in the tuples 81 are evaluated against the predefined threshold 84. When the predefined threshold 84 is defined as a floor, the tuples 85 above the predefined threshold 84 are retained while the tuples 86 falling below the predefined threshold 84 are eliminated from further consideration. By way of example, the tuples 85 corresponding to identifier 1344580 and 4136031 would be retained and the tuples 86 corresponding to identifier 0823673 through 0023471 would be eliminated using a predefined threshold 84 of 20%.

Alternatively, the predefined threshold 84 could be defined as a ceiling above which tuples are eliminated. Other forms of associating the identified advertising results 43 and associated scores 44 and applications of predefined thresholds 84 are feasible as will be appreciated by one skilled in the art.

Advertising Creatives

FIGS. 5A-C are diagrams showing, by way of example, advertising creatives 90, 93, 96 for use by the targeting and advertising creative generator 31 of FIG. 2. An advertising creative provides information about a product or service and can include text, images, sounds, and other content. An advertising creative can summarize the product or service information contained within corresponding advertising excerpts 46. In a further embodiment of the invention, an advertising creative can be based on the category names 51 or can be based on any other type or source of information describing the products or services.

An advertising creative need not follow a prescribed form and the format adopted by a particular advertising creative will depend in part upon the size and display characteristics of the Web page upon which the advertising creative will be provided. Standardized advertising creatives facilitate placement of multiple advertisements on a given Web page. In general, when provided as standardized Web-based advertisements, each advertising creative includes a product name and a body. The product name is preferably visually distinct from the body and can be presented, for example, in a larger type size with underlining, or in any other format suitable for display as Web-based content. The body presents additional information and can non-exclusively include an extended product name, description, category name, and merchant information. The body can be presented, for example, in a smaller type size, or in any other format suitable for display as Web-based content. Both the product name and body can include hyperlinks referencing further Web content. Additionally, the entire advertising creative can be provided in a frame and visually accented through the careful use of color in the text and frame. Finally, an advertising creative can include images and can be provided as freeform text, in addition to or in lieu of the two-part format.

Each of the advertising creatives 90, 93, 96 can be included in the advertisement sets 42 as part of an advertising creative tuple 101, as further described below with reference to FIG. 6. The optional advertising creative generation component 50 can build advertising creatives for inclusion in the advertisement sets 42 or advertisements 45. In a further embodiment of the invention, advertising creatives are specified relative to an advertisement 45, either directly by including an advertising creative with the advertisement 45, or indirectly, such as through a hyperlink associated with the advertisement 45. Alternatively, the corresponding advertising excerpt 43 can include hints or predefined text, which could be used as an advertising creative. As well, advertising creatives can be precomputed or cached.

In the described embodiment, each advertising creative 90 is provided as Web content written in a suitable variant of a hypertext markup language, such as the Hypertext Markup Language (HTML).

Advertising Creative Tuple

Figure 6:
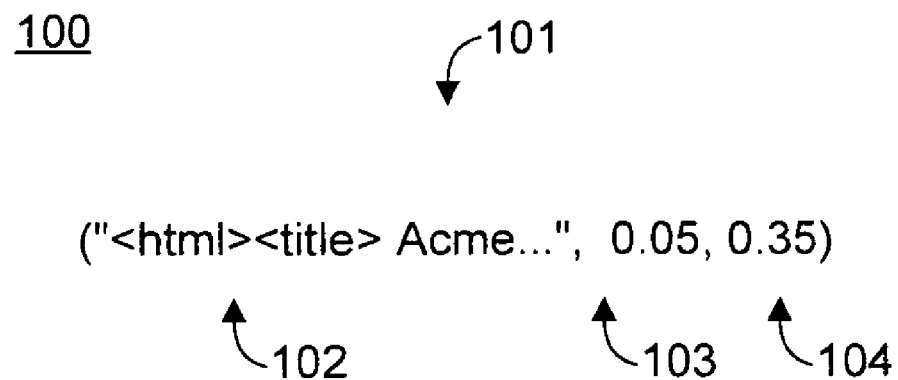
FIG. 6 is a data structure diagram showing, by way of example, an advertising creative tuple provided by the targeting and advertising creative generator of FIG. 2.

FIG. 6 is a data structure diagram 100 showing, by way of example, an advertising creative tuple 101 provided by the targeting and advertising creative generator 31 of FIG. 2. The generated advertising creatives 90, 93, 96 and associated fixed costs 48 and variable costs 49 are stored into tuples 101 provided as the advertising sets 42 and containing the code 102 defining the advertising creative 90, 93, 96 and associated fixed costs value 103 and variable costs value 104. The fixed costs value 103 and variable costs value 104 in the tuples 101 can be further evaluated by the advertising server 22 or equivalent component, which makes the final determination regarding the advertisements 45 to appear on a particular Web page. By way of continuing example, the tuple 101 contains code 102 corresponding to a partial excerpt of the HTML code generated for the advertising creative 90 shown above with reference to FIG. 5 and includes a fixed cost value 103 of 0.05 and variable cost value 104 of 0.35. Other forms of associating the advertising creatives 90, 93, 96 and associated fixed costs values 103 and variable costs values 104 are feasible, as will be appreciated by one skilled in the art.

Method Overview

Figure 7:
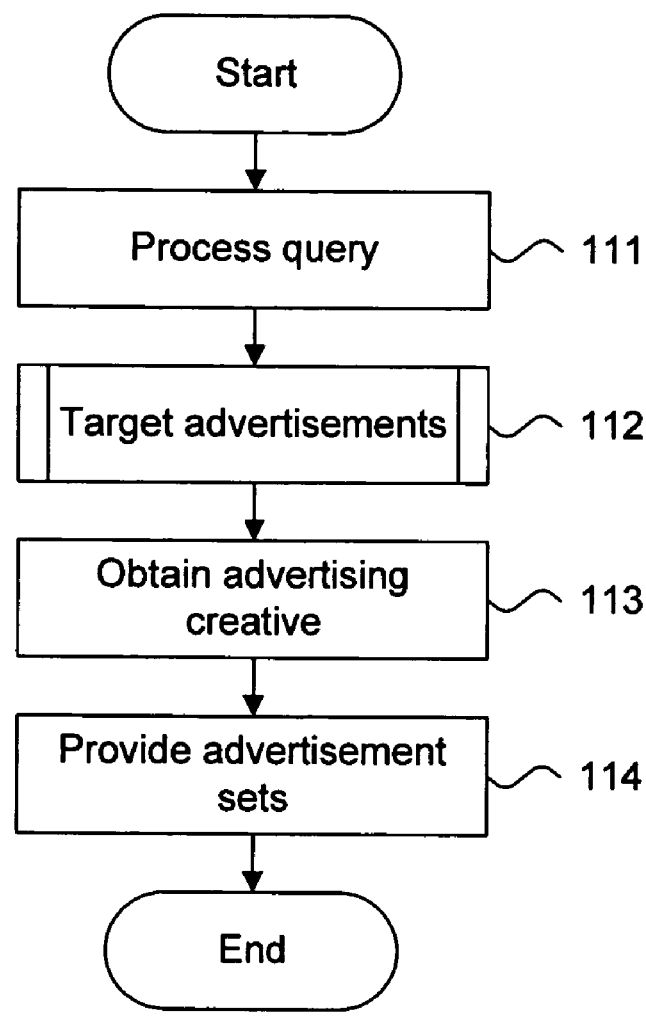
FIG. 7 is a flow diagram showing a method for automatically targeting Web-based advertisements, in accordance with the invention.

FIG. 7 is a flow diagram showing a method 110 for automatically targeting Web-based advertisements 45, in accordance with the invention. The method 110 is described as a sequence of process operations or steps, which can be executed, for instance, by the targeting and advertising creative generator 31 of FIG. 2 or other components in alternate embodiments of the invention.

The method 110 begins by processing a query 39 (block 111). Advertisements 46 are then identified and targeted (block 112), as further described below with reference to FIG. 8, which scores, filters and ranks identified advertising results 43. An advertising creative is then obtained for one or more of the remaining advertising results 43 (block 113). The advertising creatives can be obtained from several sources. First, advertising creatives can be generated from the advertising excerpt 43, such as described above with reference to the optional advertising creative generation component 50. In a further embodiment of the invention, advertising creatives can be specified relative to an advertisement 45, either directly by including an advertising creative with the advertisement 45, or indirectly, such as through a hyperlink associated with the advertisement 45. Alternatively, the corresponding advertising excerpt 43 can include hints or predefined text, which could be used as an advertising creative. As well, advertising creatives can be precomputed or cached. Following the obtaining of advertising creatives, each advertising creative and associated fixed costs 48 and variable costs 49 are provided as advertising sets (block 114) for use by the advertising server 22 or equivalent component. The routine then terminates.

Targeting Advertisements

Figure 8:
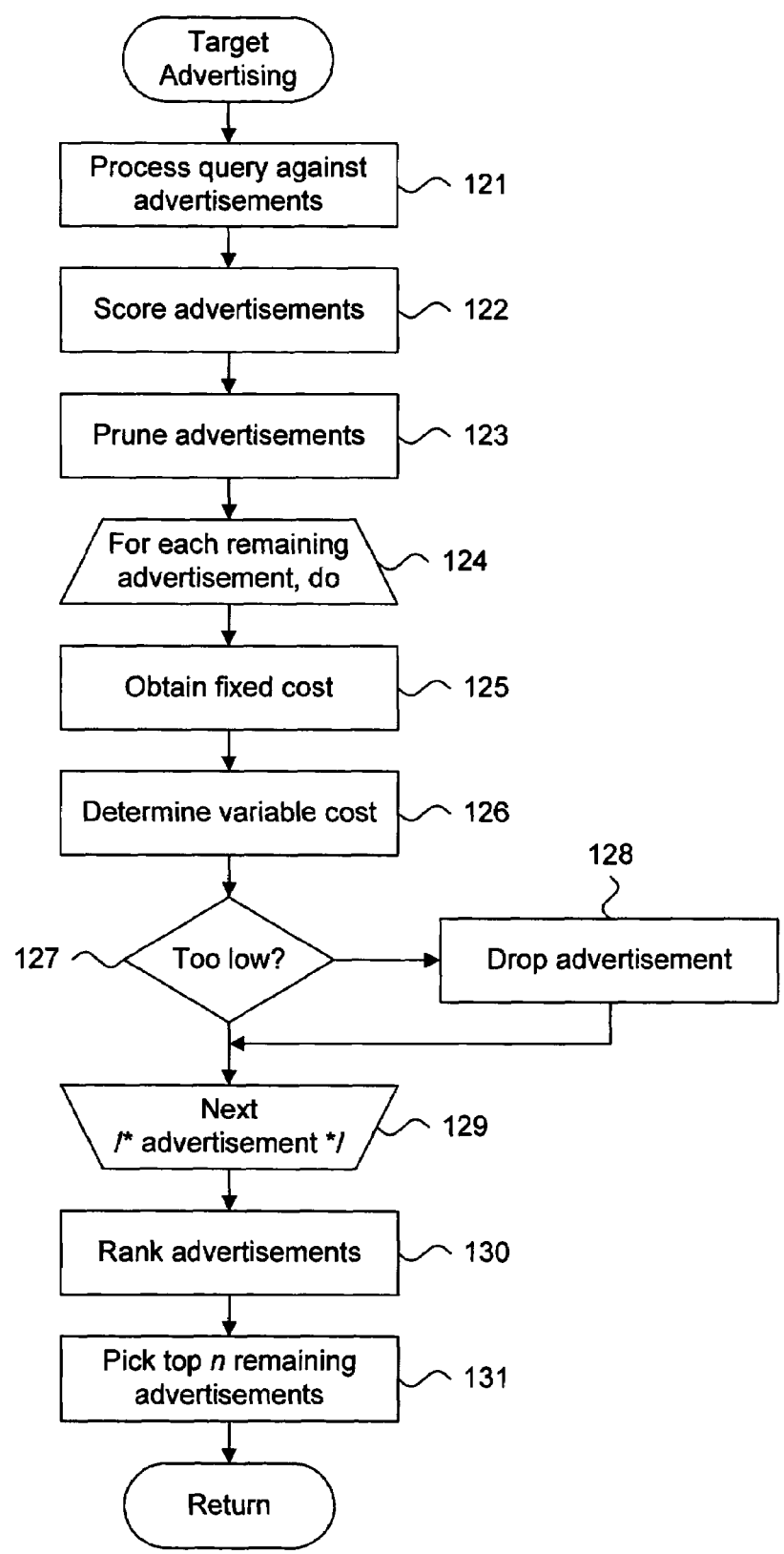
FIG. 8 is a flow diagram showing the routine for targeting advertisements for use in the method of FIG. 7.

FIG. 8 is a flow diagram showing the routine 120 for targeting advertisements 45 for use in the method 110 of FIG. 7. The purpose of the routine is to target one or more advertisements 45 based the degree of quality of match between a query 45 and information and characteristics for each identified advertisement 45.

As an initial step, a query 39 received from a user 19, generally with respect to a request for Web content 24, news messages 25, or other content 27, is processed against the advertisements 45 (block 121), which generates a set of advertising results 43. Each advertising result 43 is scored and a numerical score 44 is associated with the advertising result 43 (block 122). The numerical score 44 can be based on the degree of match to the actual content of each advertisement 45, to category names 51 of products or services to which the advertisement 45 is associated, or by a combination of actual content and category names 51. Preferably, the scored advertising results 43 are sorted by score 44. Optionally, those scored advertising results 43 failing to meet a predefined threshold can be eliminated from further consideration, or can be retained, pending further evaluation.

The remaining scored advertising results 43 are then filtered to further prune those advertising results 43 that are likely less relevant with respect to the query 39 (block 123). Each query 39 can be classified based on country, locale, language, daily budget, and other factors and the advertising results 43 are filtered by applying the classifications 41 in the query 39 to the information and characteristics associated with each advertising result 43. Following pruning, each remaining advertising result 43 is iteratively processed (blocks 124-129), as follows. The fixed cost 48 associated with the advertising result 43 is obtained (block 126), based on, for example, the size, layout and content of the advertisement 45. Similarly, the variable cost 49 associated with the advertising result 43 is determined (block 126), based on, for example, display, selection frequency or similar factors. Optionally, if either the fixed cost 48 or variable cost 49 is too low (block 127), the advertising result 43 is eliminated from further consideration (block 128). The variable cost 49 and fixed cost 48 can be considered separately or in combination. In a further embodiment of the invention, a threshold can be adjusted following an evaluation of one or both of the fixed cost 48 and variable cost 49 and the advertising result 43 can be eliminated from further consideration if the threshold is not met. Each remaining advertising result 43 is processed (block 129). Next, those advertising results 43 with sufficient relevancy and associated fixed and variable costs are ranked (block 130) by applying a selection criteria. In the described embodiment, a ranking cutoff is applied to the product of the fixed costs 48 and variable costs 49 with a randomization element to determine the advertising results 43, which are acceptable. The ranked advertising results 43 can then be ordered and evaluated against the ranking cutoff to filter the advertising results 43. Following ranking, the top n remaining advertising results 43 are selected (block 131) for generation as advertising creatives, where n is greater than one. The routine then returns.

While the invention has been particularly shown and described as referenced to some exemplary embodiments thereof, those skilled in the art will understand that the foregoing and other changes in form and detail may be made therein without departing from the spirit and scope of the invention.

What is claimed is:

1. A computer-implemented method for automatically targeting Web-based advertisements, comprising:
   identifying, by a computer system including one or more computers on a network, advertisements relative to a query, wherein identified advertisements describe characteristics relative to at least one of a product and a service;
   scoring, by the computer system, the advertisements according to a degree of a match between the query and the characteristics of the identified advertisements;
   creating, dynamically by the computer system, an advertising creative, using at least the characteristics of at least one such identified advertisement, to include in the corresponding advertisement, wherein the act of dynamically creating the advertising creative further uses terms from the query to summarize the at least one of a product and a service described by the advertisement in the advertising creative dynamically; and
   providing, by the computer system, at least some of the advertisements as Web-based content.

2. The computer-implemented method according to claim 1, further comprising:
   determining, by the computer system, the numerical score relative to at least one of a content match and a categorical match.

3. The computer-implemented method according to claim 1, further comprising:
   sorting, by the computer system, at least some of the identified advertisements by the numerical score.

4. The computer-implemented method according to claim 3, further comprising:
   selecting, by the computer system, at least some of the sorted identified advertisements relative to a predefined threshold.

5. The computer-implemented method according to claim 1, further comprising:
   filtering, by the computer system, the identified advertisements relative to at least one of a country, locale, language, and daily budget.

6. The computer-implemented method according to claim 1, further comprising:
   ranking, by the computer system, the identified advertisements using a selection criteria; and
   ordering, by the computer system, at least some of the ranked identified advertisements.

7. The computer-implemented method according to claim 6, further comprising:
   selecting, by the computer system, at least some of the ordered identified advertisements relative to a ranking cutoff, the ranking cutoff being a product of a fixed cost and a variable cost.

8. The computer-implemented method according to claim 6, further comprising:
   evaluating, by the computer system, the selection criteria based on at least one of a fixed cost, variable cost, and random factor associated with one or more of the identified advertisements.

9. The computer-implemented method according to claim 8, further comprising:
   applying, by the computer system, at least one of an acceptable fixed cost and an acceptable variable cost as the selection criteria.

10. The computer-implemented method according to claim 8, further comprising:
    providing, by the computer system, at least one of the fixed cost and the variable cost as part of the characteristics of the identified advertisements.

11. A system including one or more computers on a network for automatically targeting Web-based advertisements, the system comprising:
    an indexer to identify advertisements relative to a query, wherein identified advertisements describe characteristics relative to at least one of a product and a service;
    a scorer to score the advertisements according to match between the query and the characteristics of the identified advertisements;
    an advertising creative generator to create an advertising creative dynamically using at least the characteristics of at least one such identified advertisement, to include in the corresponding adverstisement, wherein the advertising creative generator further uses terms from the query to summarize the at least one of a product and a service described by the advertisement in the advertising creative dynamically; and
    a targeting component to provide at least some of the advertisements as Web-based content,
    wherein a numerical score is assigned to the identified advertisements based on a degree of the match.

12. A system according to claim 11, wherein the numerical score is determined relative to at least one of a content match and a categorical match.

13. A system according to claim 11, further comprising:
    a sorter to sort at least some of the identified advertisements by the numerical score.

14. A system according to claim 13, further comprising:
    a selector to select at least some of the sorted identified advertisements relative to a predefined threshold.

15. A system according to claim 11, wherein the dynamically created advertising creative is provided as part of the at least some of the advertisements.

16. An apparatus for automatically targeting Web-based advertisements, comprising:
  a) one or more processors;
  b) one or more input devices; and
  d) one or more storage devices storing processor-executable instructions which, when executed by one or more processors, perform a method of:
    (i) identifying advertisements relative to a query, wherein identified advertisements describe characteristics relative to at least one of a product and a service;
    (ii) scoring the advertisements according to a degree of a match between the query and the characteristics of the identified advertisements;
    (iii) dynamically creating an advertising creative, using at least the characteristics of at least one such identified advertisement, to include in the corresponding advertisement, wherein the act of dynamically creating the advertising creative further uses terms from the query to summarize that at least one of a product and a service described by the advertisement in the advertising creative dynamically; and
    (iv) providing at least some of the advertisements as Web-based content.

17. The system according to claim 11, wherein the characteristics of at least one such identified advertisement which are used in creating the advertising creative includes at least one of (A) a merchant name, (B) a product or service name, (C) a Uniform Resource Locator address to identify online product or service information, (D) a price of a product or service, (E) a assigned category of a product or service, (F) a type of product or service, (G) a classified category of a product or service, and (H) a confidence level of a classified category assigned to a product or service.

18. The computer-implemented method according to claim 1, wherein the characteristics of at least one such identified advertisement which are used in creating the advertising creative includes at least one of (A) a merchant name, (B) a product or service name, (C) a Uniform Resource Locator address to identify online product or service information, (D) a price of a product or service, (E) a assigned category of a product or service, (F) a type of product or service, (G) a classified category of a product or service, and (H) a confidence level of a classified category assigned to a product or service.

* * * * *